(12) United States Patent
Lyle et al.

(10) Patent No.: US 10,648,566 B2
(45) Date of Patent: May 12, 2020

(54) WIPER SEAL SYSTEM AND METHOD (71) Applicant: Vetco Gray, LLC, Houston, TX (US)

(72) Inventors: Rockford Dee Lyle, Houston, TX (US); Jesse B. Riha, Houston, TX (US); Daniel Louis Havelka, Houston, TX (US); Robert James Wagner, Houston, TX (US)

(73) Assignee: Vetco Gray, LLC, Houston, TX (US)

( * ) Notice: Subject to any disclaimer, the term of this patent is extended or adjusted under 35 U.S.C. 154(b) by 60 days.

(21) Appl. No.: 15/907,851

(22) Filed: Feb. 28, 2018

(65) Prior Publication Data
US 2019/0264813 A1 Aug. 29, 2019

(51) Int. Cl.
| F16J 15/16 | (2006.01) |
| F16J 9/20 | (2006.01) |
| F16J 15/56 | (2006.01) |
| E21B 1/00 | (2006.01) |
| F16J 15/06 | (2006.01) |

(52) U.S. Cl.
CPC ............... *F16J 15/164* (2013.01); *E21B 1/00* (2013.01); *F16J 9/20* (2013.01); *F16J 15/56* (2013.01); *F16J 15/064* (2013.01)

(58) Field of Classification Search
CPC ........... F16J 15/164; F16J 15/56; F16J 15/064
See application file for complete search history.

(56) References Cited

U.S. PATENT DOCUMENTS

| 3,866,924 A | 2/1975 | French |
| 4,124,232 A | 11/1978 | Ahlstone |
| 4,367,981 A | 1/1983 | Shapiro |
| 4,799,827 A | 1/1989 | Jaqua |
| 5,252,005 A * | 10/1993 | Koos ...................... E21B 19/006 166/364 |
| 5,429,038 A | 7/1995 | Black |
| 5,871,052 A * | 2/1999 | Benson ................. E21B 21/103 166/153 |
| 7,823,646 B2 * | 11/2010 | Ellis ...................... E21B 19/002 166/355 |

(Continued)

OTHER PUBLICATIONS

Mike Santora, "Successful offshore sealing," Aug. 11, 2015, Fluid Power World, https://www.fluidpowerworld.com/successful-offshore-sealing/.

(Continued)

*Primary Examiner* — Gilbert Y Lee
(74) *Attorney, Agent, or Firm* — Hogan Lovells US LLP (57) ABSTRACT

Embodiments of the present disclosure include systems and methods with a piston cylinder arrangement comprising an inner barrel positioned within an outer barrel, the inner barrel being linearly moveable along an axis. A primary sealing assembly at an upper end of the outer barrel includes a plurality of seals positioned to block debris from entering an interior chamber. Additionally, an end cap is coupled to the inner barrel and an end cap diameter is greater than an inner barrel outer diameter. Moreover a secondary sealing assembly is arranged between the end cap and the primary sealing assembly and includes a plurality of secondary seals positioned to block debris from entering the interior chamber of the riser tensioner, wherein the secondary sealing assembly reduces a stroke length of the inner barrel when installed above the primary sealing assembly.

20 Claims, 9 Drawing Sheets

(56) References Cited

U.S. PATENT DOCUMENTS

| | | | |
|---|---|---|---|
| 7,980,787 B1 | 7/2011 | Trent | |
| 8,517,110 B2 | 8/2013 | Trent | |
| 8,689,880 B2* | 4/2014 | Leuchtenberg | E21B 17/07 |
| | | | 166/355 |
| 2003/0111799 A1 | 6/2003 | Gilmore | |
| 2006/0108121 A1* | 5/2006 | Ellis | E21B 19/002 |
| | | | 166/367 |
| 2007/0096465 A1 | 5/2007 | Hall | |
| 2008/0251257 A1* | 10/2008 | Leuchtenberg | E21B 17/07 |
| | | | 166/355 |
| 2010/0200243 A1* | 8/2010 | Purkis | E21B 34/06 |
| | | | 166/373 |
| 2012/0292041 A1* | 11/2012 | Trent | B63B 35/44 |
| | | | 166/352 |
| 2014/0138096 A1* | 5/2014 | Leuchtenberg | E21B 17/07 |
| | | | 166/355 |
| 2016/0145951 A1 | 5/2016 | Ellis | |
| 2017/0254159 A1 | 9/2017 | Kubichek | |

OTHER PUBLICATIONS

"Wiper Seals," SKF, http://www.skf.com/us/products/seals/industrial-seals/hydraulic-seals/wiper-seals/index.html.
"Heavy Duty Hydraulic Roundline Cylinders," Parker Hannifin Corporation, 2011, Catalog HY08-M1320-1/NA, https://www.parker.com/literature/Miller%20Fluidpower/miller/cat/RDH_HY08-M1320-1_NA.pdf.
International Search Report and Written Opinion dated May 8, 2019 in corresponding PCT Application No. PCT/US19/19484.

* cited by examiner

WIPER SEAL SYSTEM AND METHOD

BACKGROUND

1. Field of the Invention

The present disclosure relates to sealing systems. More particularly, the present disclosure relates to systems and methods for wiper seals on cylinders.

2. Description of Related Art

Sealing systems may be used in many industrial applications in order to isolate components from dirty or otherwise undesirable environmental conditions. In certain applications, sealing systems may be arranged to wipe or otherwise clean linearly reciprocating components that may transition between a location upstream of the seal and a location downstream of the seal. The sealing system proximate the reciprocating components may be subjected to wear and eventually degrade, thereby reducing the effectiveness of the sealing system and potentially allowing dirt and debris to enter the downstream side of the seal.

SUMMARY

Applicants recognized the problems noted above herein and conceived and developed embodiments of systems and methods, according to the present disclosure, for secondary sealing systems.

In an embodiment a system for blocking ingress of debris into a riser tensioner includes an outer barrel. The system also includes an inner barrel arranged within the outer barrel, the inner barrel being moveable in first and second directions along an axis to reciprocate within the outer barrel. The system includes a first sealing assembly at an upper end of the outer barrel. The first sealing assembly circumferentially surrounds the inner barrel and includes a first wiper seal at a first top portion, the wiper seal arranged within a recess of a first plurality of recesses extending into a first body of the first sealing assembly, and bearing against the inner barrel. The first sealing assembly also includes a first wear ring arranged within a recesses of the first plurality of recesses, the first wear ring extending from the recess to contact the inner barrel. The first sealing assembly further includes a first seal arranged within a recesses of the first plurality of recesses. The system also includes a second sealing assembly positioned above the first top portion of the first sealing assembly. The second sealing assembly circumferentially surrounds the inner barrel and includes a second wiper seal at a second top portion, the second wiper seal arranged within a recess of a second plurality of recesses extending into a second body of the second sealing assembly, and bearing against the inner barrel. The second sealing assembly also includes a second wear ring arranged within a recesses of the second plurality of recesses, the second wear ring extending from the recess to contact the inner barrel. The second sealing assembly further includes a second seal arranged within a recesses of the second plurality of recesses. The system also includes an upper end cap arranged on the inner barrel, the upper end cap having a cap diameter that is larger than a diameter of the inner barrel.

In another embodiment a system for applying a force to a rig includes a riser tensioner having a piston cylinder arrangement for applying the force to the rig, the piston cylinder arrangement comprising an inner barrel positioned within an outer barrel, the inner barrel being linearly moveable along an axis of the riser tensioner. The system also includes a primary sealing assembly at an upper end of the outer barrel, the primary sealing assembly including a plurality of seals positioned to block debris from entering an interior chamber of the riser tensioner, the seals bearing against the inner barrel as the inner barrel translates along the axis. Additionally, the system includes an end cap coupled to the inner barrel, the end cap having a cap diameter greater than an inner barrel outer diameter, wherein the end cap is positioned a first length from the upper end of the outer barrel when the inner barrel is in an extended position and a second length from the upper end of the outer barrel when the inner barrel is in a retracted position. The system also includes a secondary sealing assembly arranged between the end cap and the primary sealing assembly, the secondary sealing assembly including a plurality of secondary seals positioned to block debris from entering the interior chamber of the riser tensioner, wherein the secondary sealing assembly reduces a stroke length of the inner barrel when installed above the primary sealing assembly.

In an embodiment a method of installing a secondary seal includes taking a riser tensioner out of service such that an inner barrel of the riser tensioner is not reciprocating along an axis of the riser tensioner while out of service. The method also includes positioning a secondary sealing assembly around the inner barrel. The method further includes coupling the secondary sealing assembly to a primary sealing assembly circumferentially surrounding the inner barrel, the secondary sealing assembly arranged above the primary sealing assembly. The method also includes bringing the riser tension back into service after the secondary sealing assembly is installed.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a secondary sealing assembly that may be coupled to a riser tensioner to reduce maintenance down time. In various embodiments, the riser tensioner includes a sealing assembly having a wiper seal that removes dirt or debris from an outer diameter of a reciprocating inner barrel. Over time, the wiper seal may begin to degrade. Degradation may lead to dirt or debris entering an interior area of the riser tensioner, which may reduce performance. Down time to replace the wiper seal or other associated seals may be extensive and expensive. Embodiments of the present disclosure are directed toward systems and methods for installing secondary sealing assemblies. In various embodiments, the secondary sealing assembly includes a wiper seal that may be utilized to remove dirt and debris from the outer diameter of the reciprocating inner barrel. Additionally, the secondary sealing assembly may be coupled to the sealing assembly, for example, via apertures and one or more fasteners. In operation, the secondary sealing assembly may be installed by sliding the secondary sealing assembly along the inner barrel after removal of an upper end cap. However, in embodiments where removal of the upper end cap is difficult or undesirable, the secondary sealing assembly may be split along a seam to thereby enable installation, for example via one or more fasteners, without removing upstream components. Accordingly, maintenance operations may be completed sooner, thereby reducing costs and down times.

Figure 1:
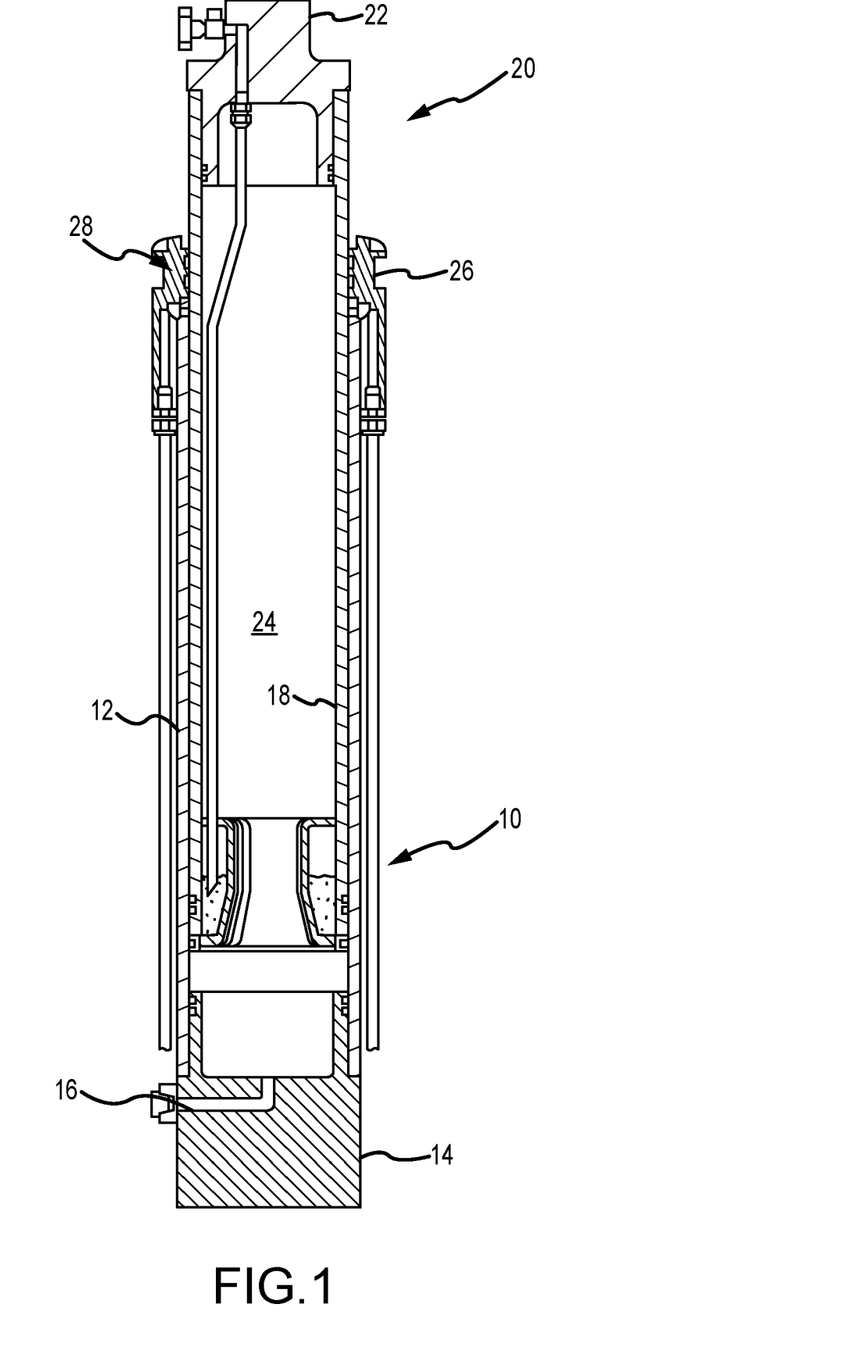
FIG. 1 is a cross-sectional side view of an embodiment of a riser tensioner, in accordance with embodiments of the present disclosure.

FIG. 1 is a cross-sectional side elevational view of an embodiment of a riser tensioner 10 (e.g., riser). In operation, the riser tensioner may be utilized in off-shore oil and gas drilling operations. Waves and current may cause vertical and/or lateral movement of a platform relative to the riser. Certain components of the riser tensioner 10 (e.g., riser 10) may be coupled to a wellhead arranged at a sea floor and be used to manage differential movements between some components the riser tensioner 10 and a rig. In the illustrated embodiment, the riser tensioner 10 includes an outer barrel 12 that is a cylinder having a lower closed end cap 14. In the illustrated embodiment, an inlet port 16, for example for a gas, extends through the lower end cap 14 for introduction of the gas, such as nitrogen. The illustrated riser tensioner 10 is in the form of a hollow piston that includes an inner barrel 18 that slides in a telescoping manner within the outer barrel 12. As shown, the inner barrel 18 is illustrated as a cylinder that has an upper end 20 that protrudes above the outer barrel 12 and terminates with an upper end cap 22. In the illustrated embodiment, the outer barrel 12 and the inner barrel 18 define a chamber 24 of variable volume.

In the embodiment illustrated in FIG. 1, the riser tensioner 10 includes a collar 26 proximate the upper end cap 22 and located on the outer barrel 12. The collar 26 includes a sealing assembly 28, which may include a wiper seal. During reciprocating movement of the inner barrel 18, the wiper seals block entry of debris or dirt that may be on the inner barrel 18 from entering the outer barrel 12. In other words, the wiper seal acts a barrier to entry to block or restrict debris from negatively influencing movement of the inner barrel 18. It should be appreciated that certain elements of the riser tensioner 10 have been removed for clarity and simplification.

Figure 2:
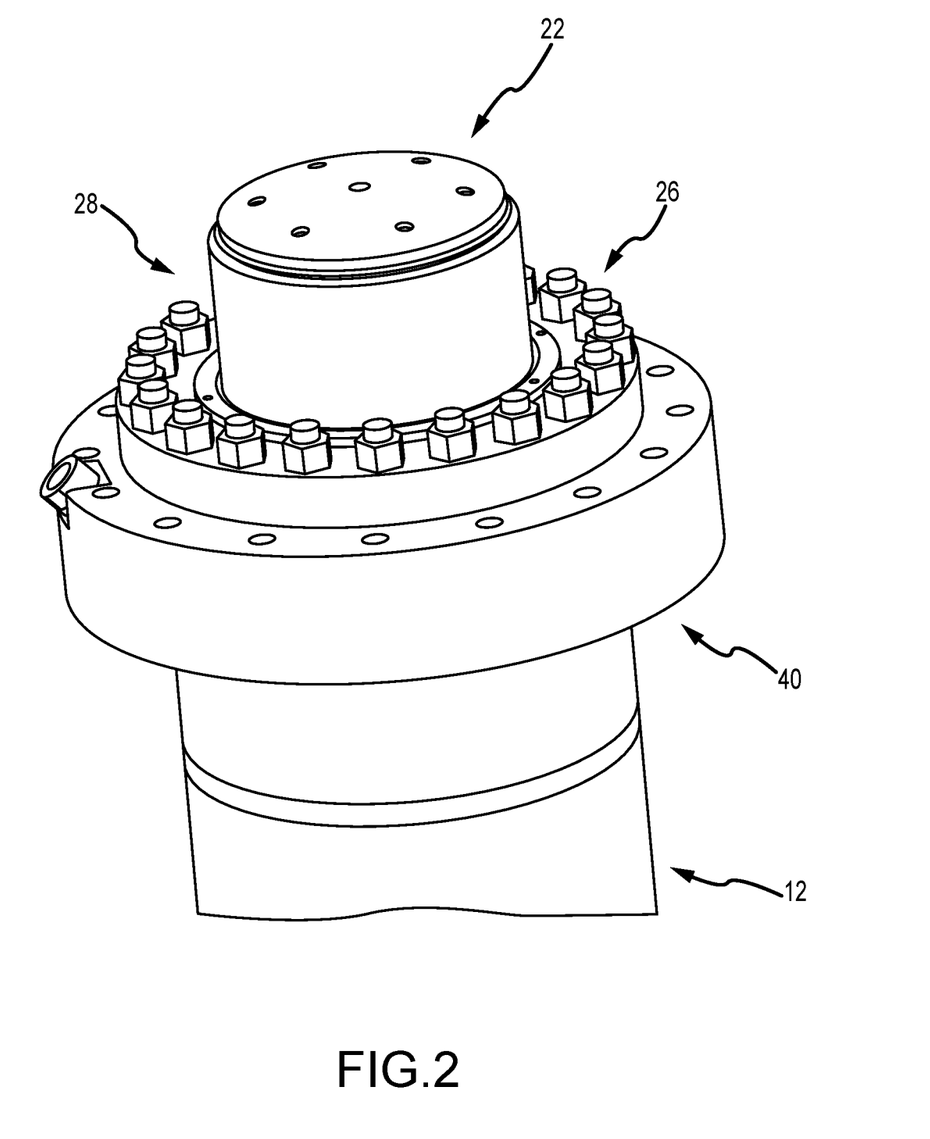
FIG. 2 is a front perspective view of an embodiment of an upper end of a riser tensioner, in accordance with embodiments of the present disclosure.

FIG. 2 is a front perspective view of an embodiment of an upper end 40 of the outer barrel 12. In the illustrated embodiment, the collar 26 includes the sealing assembly 28, which is arranged circumferentially about the inner barrel 18 (not pictured) and the upper end cap 22. In embodiments, the inner barrel 18 reciprocates between an extended position (not shown) and a retracted position (shown). It should be appreciated that various connectors, fasteners, and the like may be utilized to form at least a portion of the riser tensioner.

Figure 3:
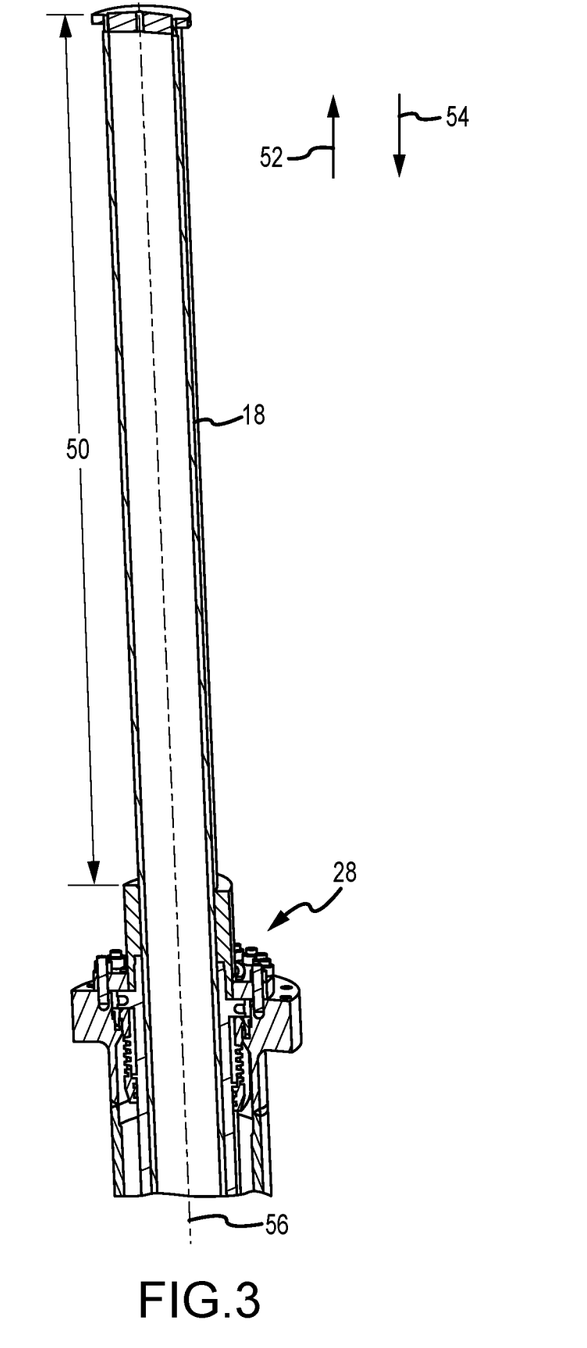
FIG. 3 is cross-sectional side view of an embodiment of a riser tensioner in an extended position, in accordance with embodiments of the present disclosure.

FIG. 3 is a cross-sectional side elevational view of an embodiment of the riser tensioner 10 wherein the inner barrel 18 is in an extended position. As shown, a distance 50 between the end cap 22 and the sealing assembly 28 is greater than the distance illustrated in FIG. 2. In operation, the inner barrel 18 moves in a first direction 52 toward the illustrated extended position and a second direction 54 toward the retracted position illustrated in FIG. 2. Linear movement along an axis 56 of the riser tensioner 10 may be driven by hydraulic force, pneumatic force, electrical impulses, or any other reasonable driving mechanism. As will be described below, movement in the first and second direction 52, 54 applies forces to one or more seals arranged in the sealing assembly 28, which may degrade or otherwise reduce the life of the seals.

Figure 4:
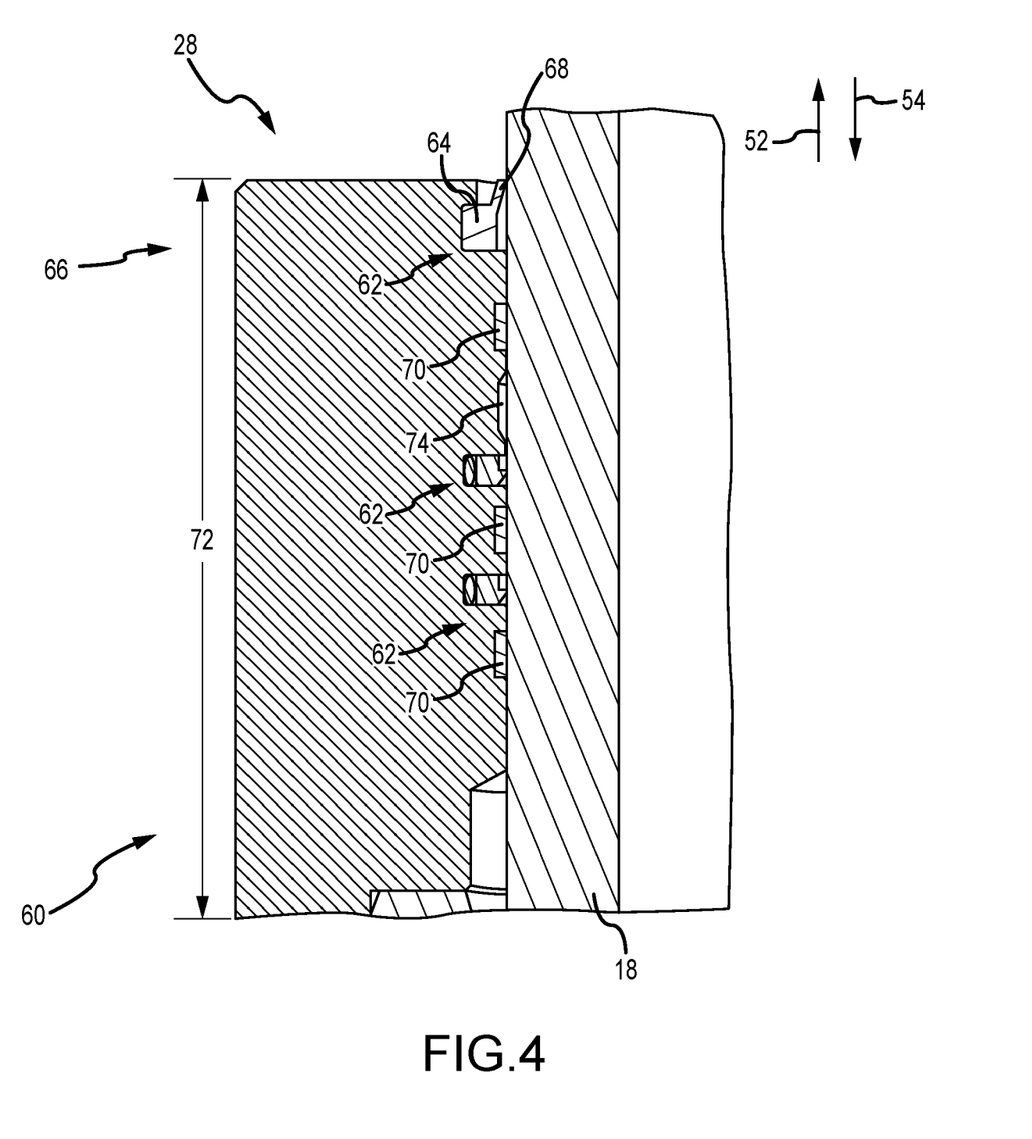
FIG. 4 is a cross-sectional side view of an embodiment of a sealing assembly, in accordance with embodiments of the present disclosure.

FIG. 4 is a cross-sectional side elevational view of an embodiment of the sealing assembly 28. In the illustrated embodiment, the sealing assembly is arranged circumferentially about the inner barrel 18 and includes a body 60 have a plurality of recesses 62 for receiving seals, wear bands, and the like. As shown in FIG. 4, a wiper seal 64 is arranged in the recesses 62 at a top portion 66 of the sealing assembly 28. The wiper seal 64 includes an arm 68 that flexes as the inner barrel 18 moves longitudinally in the first and second directions 52, 54. The flexible arm 68 serves to wipe debris or other contaminants from an outer surface of the inner barrel 18, thereby blocking the debris from entering interior portions of the riser tensioner 10 or an annular volume between the inner barrel 18 and the outer barrel 12. The wiper seal 64 may break down or otherwise lose sealing capability over time, as the movement of the inner barrel 18 continuously applies forces to the arm 68. As will be described below, embodiments of the present disclosure may be incorporated to provide improved sealing capacity for the riser tensioner 10.

The illustrated sealing assembly 28 further includes wear bands 70 arranged along a length 72 of the body 60. In the illustrated embodiment, the wear bands 70 guide the inner barrel 18 and absorb transverse forces. Moreover, the wear bands 70 may reduce or eliminate metal to metal contact between the body 60 and the inner barrel 18. The sealing assembly 28 further includes seals 74. The seals 74 provide further isolation between the interior of the riser tensioner 10 and the exterior.

Figure 5:
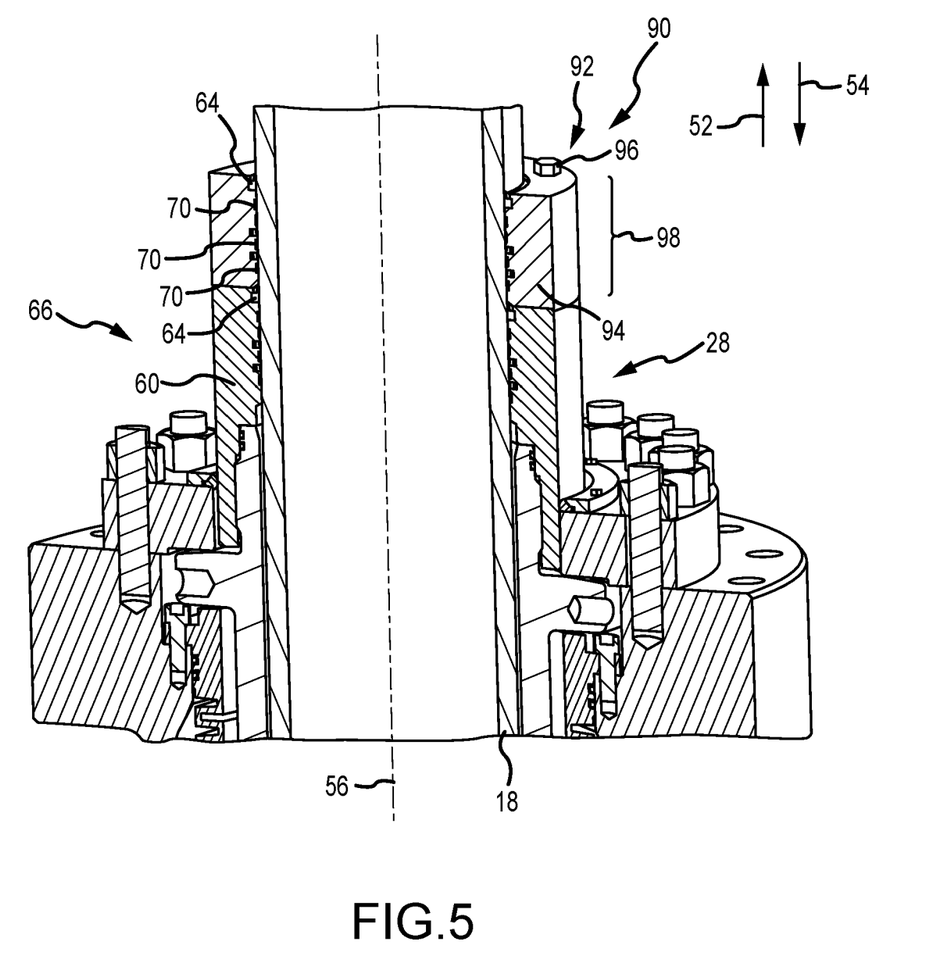
FIG. 5 is partial sectional perspective view of an embodiment of a riser tension having a secondary sealing assembly, in accordance with embodiments of the present disclosure.

FIG. 5 is a partial sectional perspective view of an embodiment of the riser tensioner 10 including a secondary sealing assembly 90. In the illustrated embodiment, the secondary sealing assembly 90 is arranged above the top portion 66 of the body 60, relative to the first direction 52. That is, the secondary sealing assembly 90 is arranged closer to the upper cap 22. In the illustrated embodiment, the secondary sealing assembly 90 includes the wiper seal 64, the seals 74, and the wear bands 70. As a result, any functionality lost in the sealing assembly 28 due to movement of the inner barrel 18 may be recovered by utilizing the secondary sealing assembly 90.

In the illustrated embodiment, the secondary sealing assembly 90 includes an aperture 92 extending through a body 94 of the secondary sealing assembly 90. The aperture 92 enables a fastener 96, such as the illustrated bolt, to couple the secondary sealing assembly 90 to the sealing assembly 28. There may be any number of apertures 92 utilized to couple the secondary sealing assembly 90 to the sealing assembly 28. For example, there may be 1, 2, 3, 4, 5, 6, or any other reasonable number of apertures 92 arranged circumferentially about the secondary sealing assembly 90. It should be appreciated that the relative locations of the apertures 92 may be particularly selected to distribute forces along the secondary sealing assembly 90 and/or provide improved sealing characteristics. In other embodiments, clamps, adhesives, or the like may be utilized to secure the secondary sealing assembly 90 to the sealing assembly 28.

It should be appreciated that installation of the secondary sealing assembly 90 may reduce a distance of the stroke of the inner barrel 18 by a length 98 of the secondary sealing assembly 90 in embodiments where the riser tensioner 10 does not include space for the secondary sealing assembly 90. This reduced stroke length, however, is unlikely to impair operation of the riser tensioner 10. For instance, the riser tensioner 10 is rarely in a position such that the inner barrel 18 bottoms out at the bottom of the stroke (e.g., in the retracted position). Accordingly, reducing a small percentage of the stroke length is acceptable in order to provide the sealing capabilities provided by the secondary sealing assembly 90. Furthermore, it should be appreciated that in various embodiments riser tensioners 10 may be designed to accommodate the secondary sealing assembly 90 without reducing the stroke.

Figure 6:
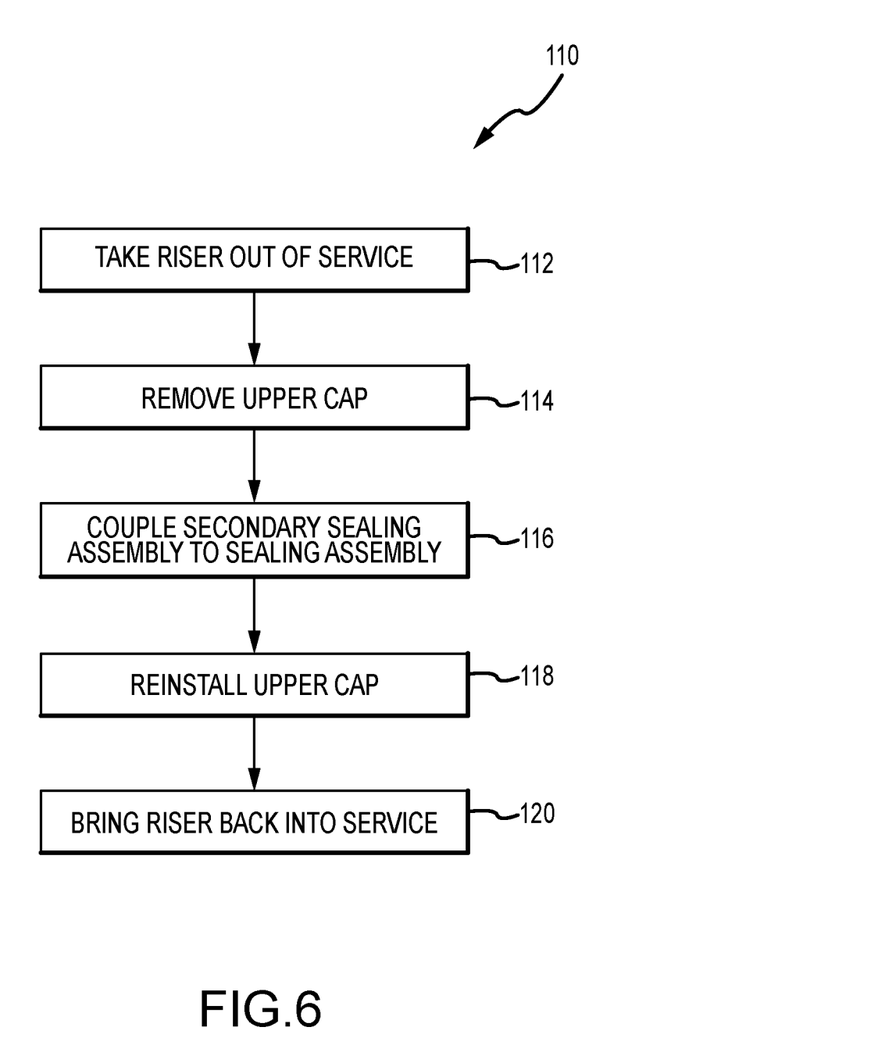
FIG. 6 is a flow chart of an embodiment of a method for installing a secondary sealing assembly, in accordance with embodiments of the present disclosure.

FIG. 6 is a flow chart of an embodiment of a method 110 for installing the secondary sealing assembly 90. In various embodiments, the upper end cap 22 may be removable, thereby enabling installation of the secondary sealing assembly 90 along the inner barrel 18 and onto the sealing assembly 28. The method 110 may begin with taking the riser tensioner 10 out of service (block 112). In various embodiments, the rig may include a plurality of riser tensioners, such as 4 risers, and be operable while one of the risers is offline. In certain embodiments, the inner barrel 18 is transitioned to the retracted position when the riser tensioner 10 is out of service. Thereafter, the upper end cap 22 is removed (block 114). For example, the upper end cap 22 may be coupled to the inner barrel 18 via one or more fasteners, which can be removed to enable installation of secondary sealing assembly 90. As will be appreciated, in various embodiments a diameter of the upper end cap 22 is larger than a diameter of the inner barrel 18, and as a result, the secondary sealing assembly 90 may not be capable of installation while the upper end cap 22 is in place. Next, the secondary sealing assembly 90 is coupled to the sealing assembly 28 (block 116). For example, apertures 92 of the secondary sealing assembly 90 and the sealing assembly 28 may be aligned. Then, the fasteners 96 may be utilized to couple the secondary sealing assembly 90 to the sealing assembly 98. It should be appreciated that other embodiments may use different fasteners, such as clamps or adhesives. Thereafter, the upper end cap 22 is reinstalled (block 118). Upon reinstallation, the riser tensioner 10 may be brought back online and into service (block 120). As such, operation of the rig may commence as normal with the plurality of riser tensioners 10. Advantageously, installation using the method 110 may minimize down time and allow full operation of the system of risers faster than replacing the seals 74 and/or the wiper seal 64 of the seal assembly 28. Accordingly, incorporation of the secondary sealing assembly 90 and the method 110 improves efficiency of maintenance operations at the rig and reduces costs associated with down time and maintenance activities.

Figure 7:
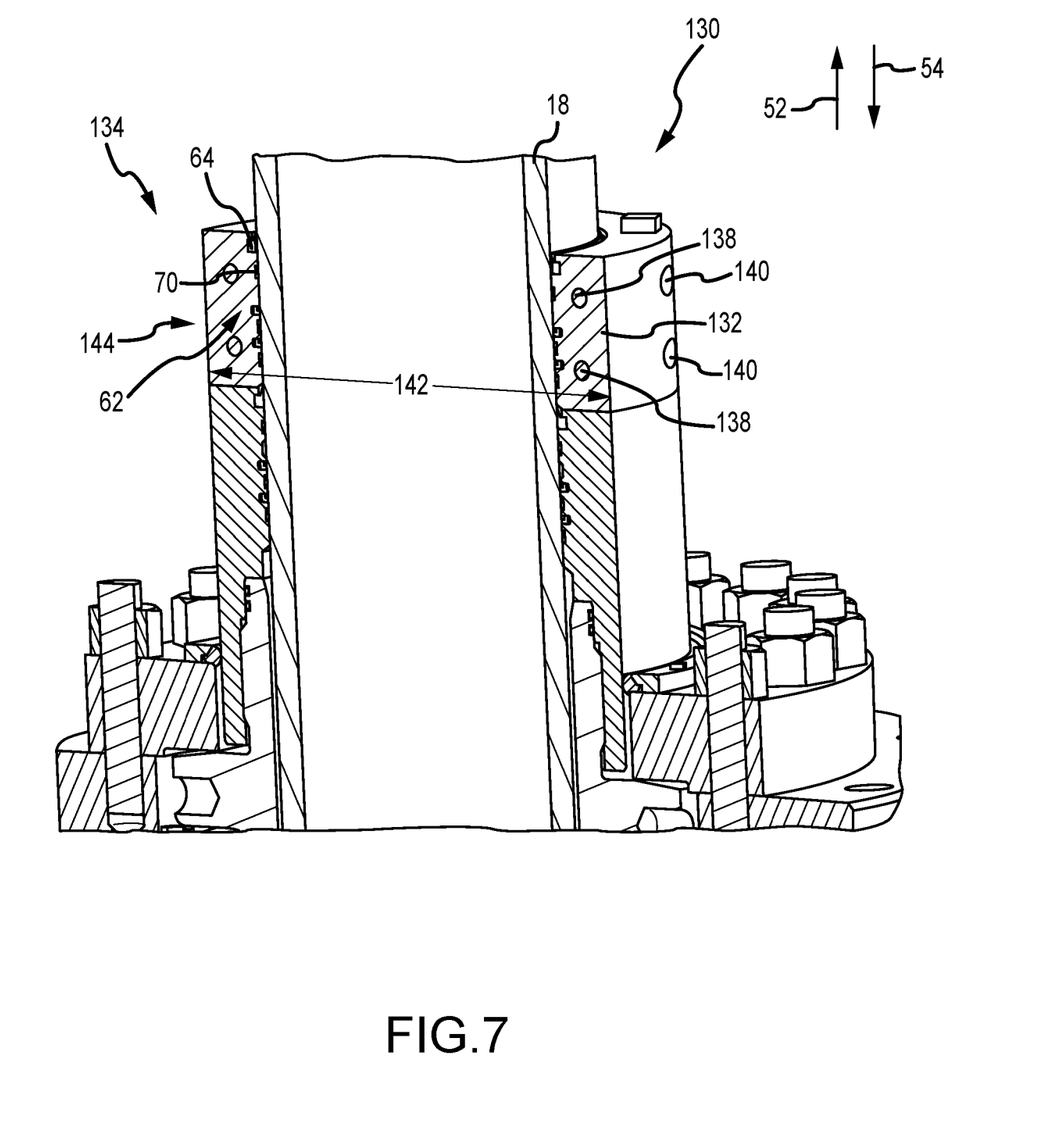
FIG. 7 is partial sectional perspective view of an embodiment of a secondary sealing assembly, in accordance with embodiments of the present disclosure.
Figure 8:
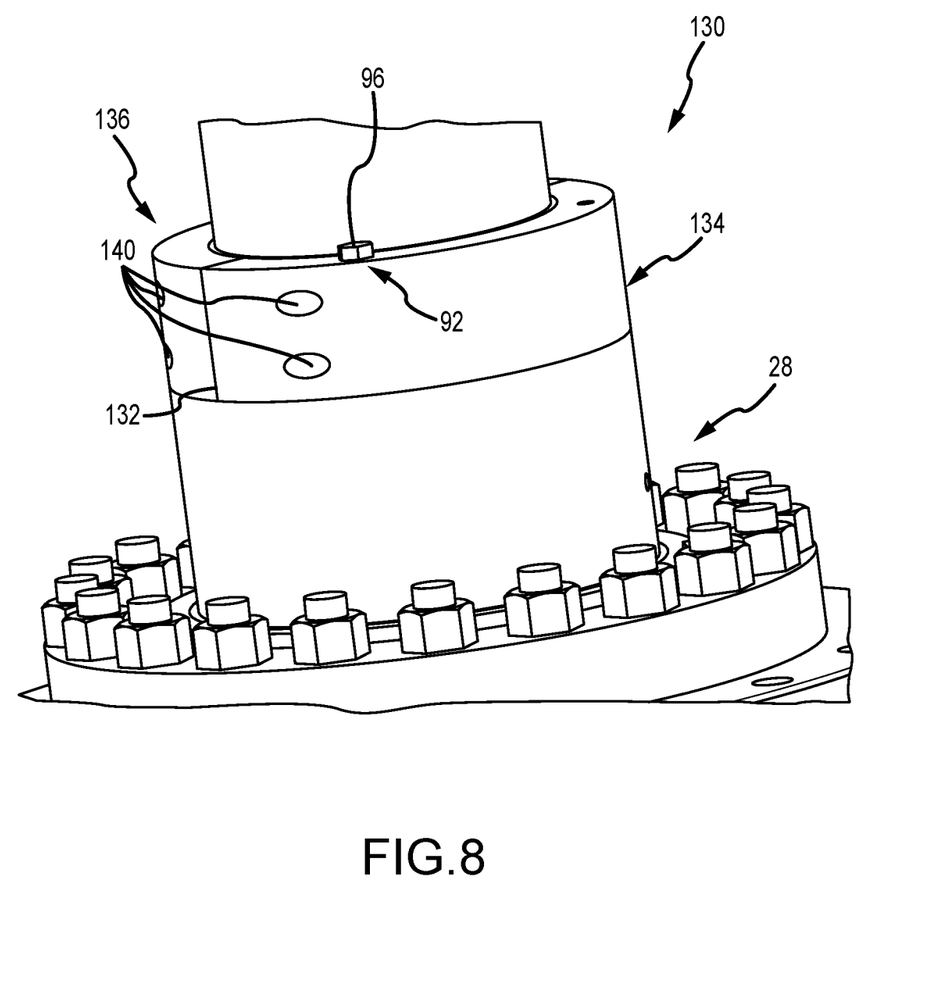
FIG. 8 is a perspective view of an embodiment of a secondary sealing assembly, in accordance with embodiments of the present disclosure.

FIG. 7 is a partial perspective view of an embodiment of a secondary sealing assembly 130. As described above, in certain embodiments the secondary sealing assembly 130 may be installed over the inner barrel 18 after removal of the upper end cap 22. However, in various embodiments, it may be undesirable or difficult to remove the upper end cap 22. Accordingly, the secondary sealing assembly 130 is split along a seam 132 to thereby enable installation without removing the upper end cap 22. The secondary sealing assembly 130 includes a first portion 134 and a second portion 136 (FIG. 8, removed in FIG. 7 for clarity). These two portions may be coupled together via a fastener 138, which extends through openings 140 extending through the first and second portions 134, 136. In the embodiment illustrated in FIG. 7, the openings 140 are arranged along an outer diameter 142 of a body 144 of the secondary sealing assembly 130. The openings 140 in the illustrated embodiment are substantially circular, however any other geometric shape may be utilized. While two openings 140 are illustrated, it should be appreciated that any reasonable number of openings 140 may be used. Moreover, while the illustrated embodiment includes the fasteners 138, it should be appreciated that other methods may be used to couple the first and second portions 134, 136 together. For example, a clamp or connector may be positioned at the seam 132 to couple the first and second portions 134, 136 together.

As described above, the secondary sealing assembly 130 includes the wiper seal 64, the wear bands 70, and the seals 74 arranged within recesses 62. The wiper seal 64 cleans dirt or debris from an outer diameter of the inner barrel 18 as the inner barrel 18 translates longitudinally in the first and second directions 52, 54. It should be appreciated that in the illustrated embodiment the wiper seal 64, wear bands 70, and the seals 74 may be split to thereby enable installation without removing the upper end cap 22.

FIG. 8 is a perspective view of an embodiment of the secondary sealing assembly 130. As described above, the secondary sealing assembly 130 includes a seam 132 to join the first portion 134 and the second portion 136. The illustrated embodiment includes the openings 140 extending through both the first and second portions 134, 136. Accordingly, the secondary sealing assembly 130 may be split and installed without removing the upper end cap 22. Similarly to the secondary sealing assembly 90, apertures 92 receive the fasteners 96 to couple the secondary sealing assembly 130 to the sealing assembly 28. Accordingly, the secondary sealing assembly 130 may be installed with reduced down time than by reworking or removing the sealing assembly 28.

Figure 9:
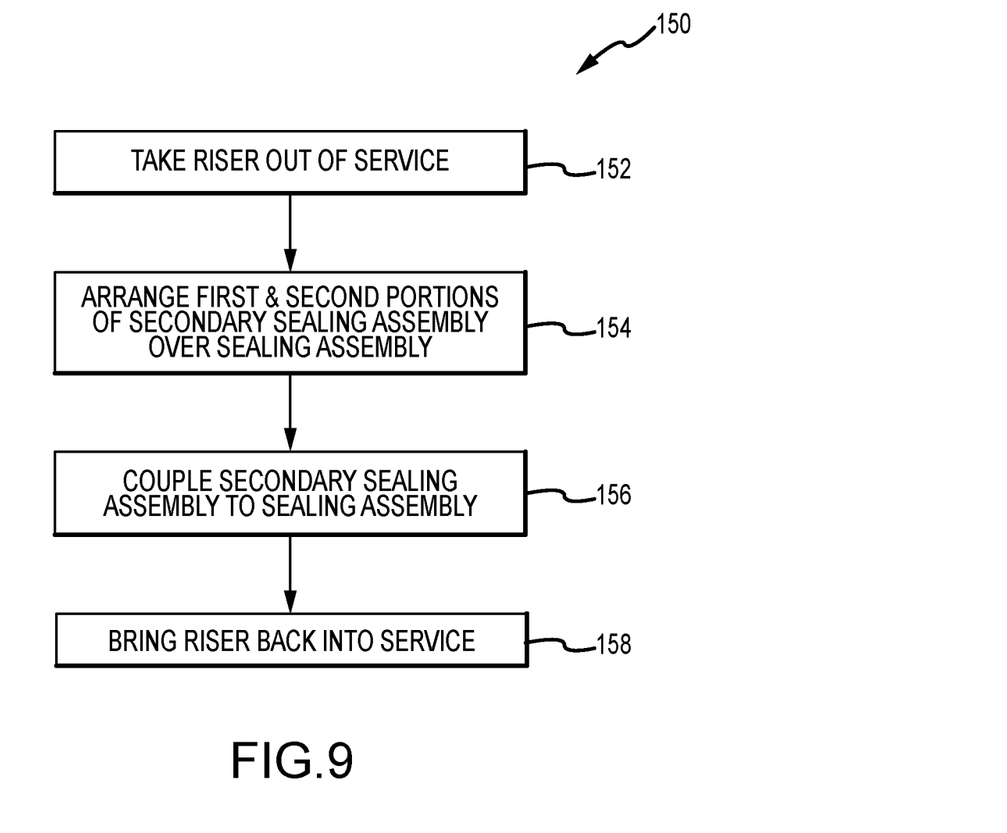
FIG. 9 is a flow chart of an embodiment of a method for installing a secondary sealing assembly, in accordance with embodiments of the present disclosure.

FIG. 9 is a flow chart of an embodiment of a method 150 for installing the secondary sealing assembly 130. In various embodiments, the upper end cap 22 may not be removable, or it may be undesirable to remove the upper end cap 22. As such, the secondary sealing assembly 130 may not be installable over the inner barrel 18, as described above, because in various embodiments an outer diameter of the upper end cap 22 is greater than an outer diameter of the inner barrel 18 and also greater than an inner diameter of the secondary sealing assembly 130. The method 150 may begin with taking the riser tensioner 10 out of service (block 152). In various embodiments, the rig may include a plurality of riser tensioners, such as 4 risers, and be operable while one of the risers is offline. In certain embodiments, the inner barrel 18 is transitioned to the retracted position when the riser tensioner 10 is out of service. However, because the secondary sealing assembly 130 has a length that reduces the stroke length of the inner barrel 18, the inner barrel 18 is not bottomed out when the riser is taken offline. Next, the first and second portions 134, 136 are positioned over the sealing assembly 28 (block 154). As described above, the secondary sealing assembly 130 is split along the seam 132 to thereby enable the first and second portions 134, 136 to be independently positioned about the inner barrel 18. Accordingly, installation may occur without removing upstream components that have a larger diameter than an inner diameter of the secondary sealing assembly 130. Next, the secondary sealing assembly 90 is coupled to the sealing assembly 28 (block 156). For example, apertures 92 of the secondary sealing assembly 90 and the sealing assembly 28 may be aligned. Then, the fasteners 96 may be utilized to couple the secondary sealing assembly 90 to the sealing assembly 98. It should be appreciated that other embodiments may use different fasteners, such as clamps or adhesives. Thereafter, the riser tensioner 10 may be brought back online and into service (block 158). As such, operation of the rig may commence as normal with the plurality of riser tensioners 10. Advantageously, installation using the method 150 may minimize down time and allow full operation of the system of risers faster than replacing the seals 74 and/or the wiper seal 64 of the seal assembly 28. Accordingly, incorporation of the secondary sealing assembly 130 and the method 150 improves efficiency of maintenance operations at the rig and reduces costs associated with down time and maintenance activities.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for blocking ingress of debris into a riser tensioner, the system comprising:
   an outer barrel;
   an inner barrel arranged within the outer barrel, the inner barrel being moveable in first and second directions along an axis to reciprocate within the outer barrel;
   a first sealing assembly at an upper end of the outer barrel, the first sealing assembly circumferentially surrounding the inner barrel and comprising:
      a first wiper seal at a first top portion, the wiper seal arranged within a first recess of a first plurality of recesses extending into a first body of the first sealing assembly, and bearing against the inner barrel;
      a first wear ring arranged within a second recess of the first plurality of recesses, the first wear ring extending from the second recess to contact the inner barrel; and
      a first seal arranged within a third recess of the first plurality of recesses;
   a second sealing assembly positioned above the first top portion of the first sealing assembly and formed in a second outer barrel, the second sealing assembly circumferentially surrounding the inner barrel and comprising:
      a second wiper seal at a second top portion, the second wiper seal arranged within a first recess of a second plurality of recesses extending into a second body of the second sealing assembly, and bearing against the inner barrel;
      a second wear ring arranged within a second recess of the second plurality of recesses, the second wear ring extending from the second recess to contact the inner barrel; and
      a second seal arranged within a third recess of the second plurality of recesses; and
   an upper end cap arranged on the inner barrel, the upper end cap having a cap diameter that is larger than a diameter of the inner barrel.

2. The system of claim 1, wherein the upper end cap is removably coupled to the inner barrel and the second sealing assembly has a continuous cylindrical body with an inner diameter that is larger than the diameter of the inner barrel.

3. The system of claim 1, wherein the second sealing assembly includes a seam, the seam separating the second sealing assembly into a first portion and a second portion.

4. The system of claim 3, wherein each of the first and second portions of the second sealing assembly include holes extending through an outer diameter of the secondary sealing assembly, in a direction substantially transverse to the axis, that align when the first and second portions are mated together.

5. The system of claim 3, wherein the first and section portions are coupled together via a fastener, a clamp, an adhesive, or a combination thereof.

6. The system of claim 1, wherein each of the first and second sealing assembly comprise apertures, the apertures arranged to align when the second sealing assembly is stacked on the first sealing assembly such that fasteners extend through respective apertures to couple the second sealing assembly to the first sealing assembly.

7. The system of claim 1, wherein a stroke length of the inner barrel is reduced after the second sealing assembly is coupled to the first sealing assembly.

8. A system for applying a force to a rig, the system comprising:

a riser tensioner having a piston cylinder arrangement for applying the force to the rig, the piston cylinder arrangement comprising an inner barrel positioned within an outer barrel, the inner barrel being linearly moveable along an axis of the riser tensioner;

a primary sealing assembly at an upper end of the outer barrel, the primary sealing assembly including a plurality of seals positioned to block debris from entering an interior chamber of the riser tensioner, the seals bearing against the inner barrel as the inner barrel translates along the axis;

an end cap coupled to the inner barrel, the end cap having a cap diameter greater than an inner barrel outer diameter, wherein the end cap is positioned a first length from the upper end of the outer barrel when the inner barrel is in an extended position and a second length from the upper end of the outer barrel when the inner barrel is in a retracted position; and a secondary sealing assembly arranged between the end cap and the primary sealing assembly, the secondary sealing assembly positioned in a second outer barrel and including a plurality of secondary seals positioned to block debris from entering the interior chamber of the riser tensioner, wherein the secondary sealing assembly reduces a stroke length of the inner barrel when installed above the primary sealing assembly.

9. The system of claim 8, wherein the end cap is removably coupled to the inner barrel and the secondary sealing assembly comprises a cylindrical body that wraps around the outer diameter of the inner barrel.

10. The system of claim 8, wherein the secondary sealing assembly is installed after one or more of the plurality of seals of the primary sealing assembly has been damaged or degraded.

11. The system of claim 8, wherein the secondary sealing assembly includes a seam separating the secondary sealing assembly into a first portion and a second portion.

12. The system of claim 8, wherein the first and second portions of the secondary sealing assembly are coupled together to circumferentially surround the inner barrel, the first and second portions each including one or more holes extending through respective bodies of the respective portions in a direction substantially transverse to the axis.

13. The system of claim 12, wherein the first and section portions are coupled together via a fastener, a clamp, an adhesive, or a combination thereof.

14. The system of claim 8, wherein the secondary sealing assembly includes a wiper seal at a top portion, the wiper seal having an arm that bears against the inner barrel, and in operation blocks debris from entering the interior chamber of the riser tension as the inner barrel transitions from the extended position to the retracted position.

15. The system of claim 8, wherein each of the primary and secondary sealing assemblies comprise apertures, the apertures arranged to align when the secondary sealing assembly is stacked on the primary sealing assembly such that fasteners extend through respective apertures to couple the secondary sealing assembly to the primary sealing assembly.

16. A method of installing a secondary seal, the method comprising:

taking a riser tensioner out of service such that an inner barrel of the riser tensioner is not reciprocating along an axis of the riser tensioner, within a first outer barrel, while out of service;

positioning a second outer barrel, including a secondary sealing assembly around the inner barrel;

coupling the secondary sealing assembly to a primary sealing assembly circumferentially surrounding the inner barrel, the secondary sealing assembly arranged above the primary sealing assembly; and bringing the riser tension back into service after the secondary sealing assembly is installed.

17. The method of claim 16, further comprising:

removing an end cap arranged on an upper end of the inner barrel, the end cap having a larger diameter than an inner barrel outer diameter; and sliding the secondary sealing assembly along the inner barrel to couple the secondary sealing assembly to the primary sealing assembly.

18. The method of claim 16, further comprising:

splitting the secondary sealing assembly along a seam, the seam separating the secondary sealing assembly into a first portion and a second portion; and coupling the first portion and the second portion together about the inner barrel.

19. The method of claim 18, wherein the secondary sealing assembly is installed without removing upstream components associated with the inner barrel.

20. The method of claim 16, further comprising:

limiting a stroke length of the inner barrel after installation of the secondary sealing assembly such that the inner barrel does not bottom out after installation of the secondary sealing assembly.

* * * * *